United States Patent [19]

Gramm et al.

[11] 3,852,602
[45] Dec. 3, 1974

[54] SCINTILLATION CAMERA WITH RAPID SEQUENCE IMAGING DEVICE

[75] Inventors: Richard F. Gramm, Ellicott City, Md.; Philip W. Walton, Richmond, Va.

[73] Assignee: Nuclear-Chicago Corporation, Des Plaines, Ill.

[22] Filed: Dec. 4, 1972

[21] Appl. No.: 312,231

[52] U.S. Cl................... 250/369, 250/361, 250/367
[51] Int. Cl.............................................. G01t 1/20
[58] Field of Search .......... 250/321, 475, 361, 363, 250/367, 369

[56] References Cited
UNITED STATES PATENTS

| | | | |
|---|---|---|---|
| 3,509,339 | 4/1970 | Doehner | 250/475 |
| 3,560,740 | 2/1971 | Tripp | 250/475 |
| 3,573,458 | 4/1971 | Anger | 250/369 |
| 3,612,865 | 10/1971 | Walker | 250/369 |
| 3,684,886 | 8/1972 | Muehllegner | 250/369 |

*Primary Examiner*—Harold A. Dixon
*Attorney, Agent, or Firm*—Walter C. Ramm; Peter J. Sgarbossa; Charles H. Thomas

[57] ABSTRACT

An Anger-type camera with a rapid sequence imaging device for recording a series of sequential images on a single sheet of 11 × 14 inch photographic film. The CRT image is minified and electronically stepped across the CRT screen under the control of a timer. The minified image can also be placed at a particular selected location by a manual control.

4 Claims, 7 Drawing Figures

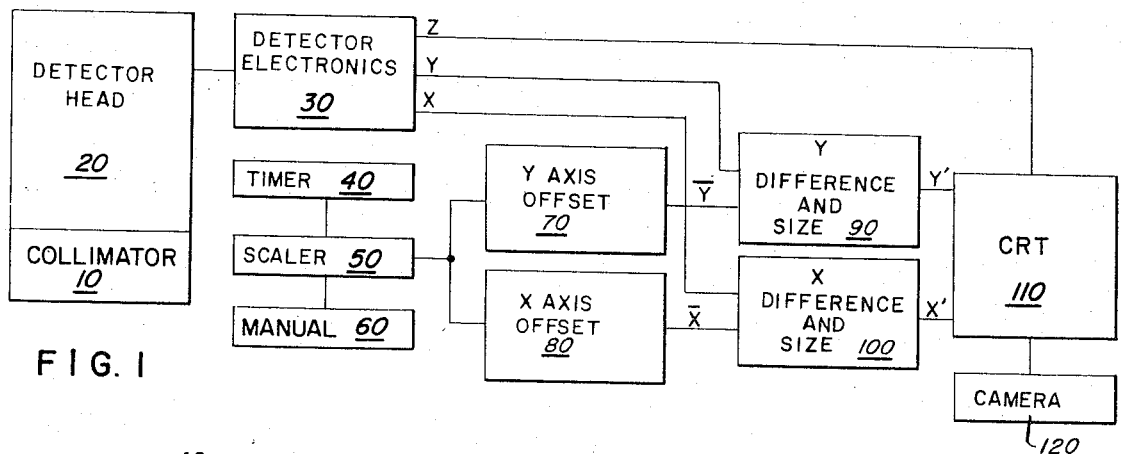
FIG. 1
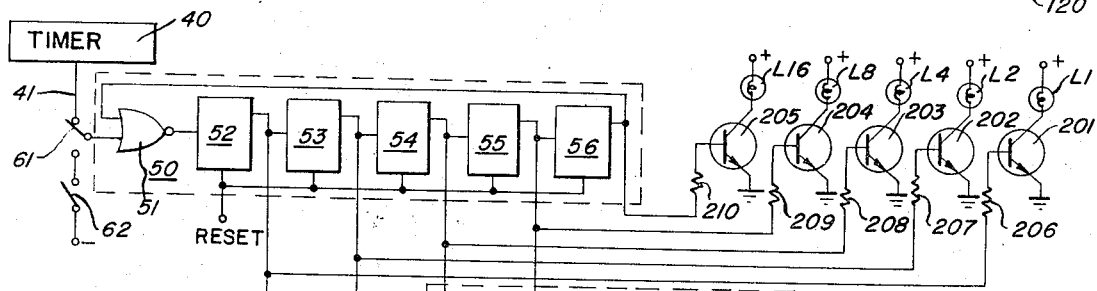
FIG. 2
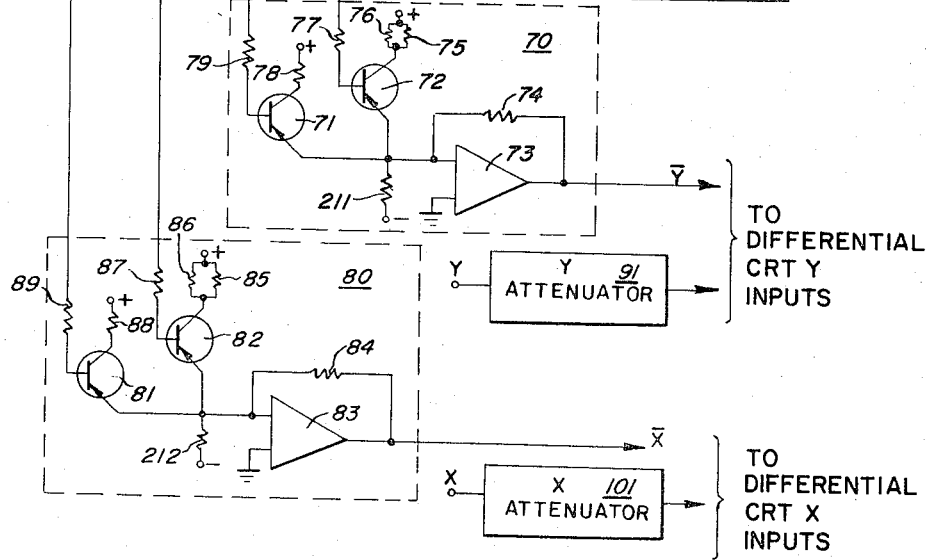
FIG. 3
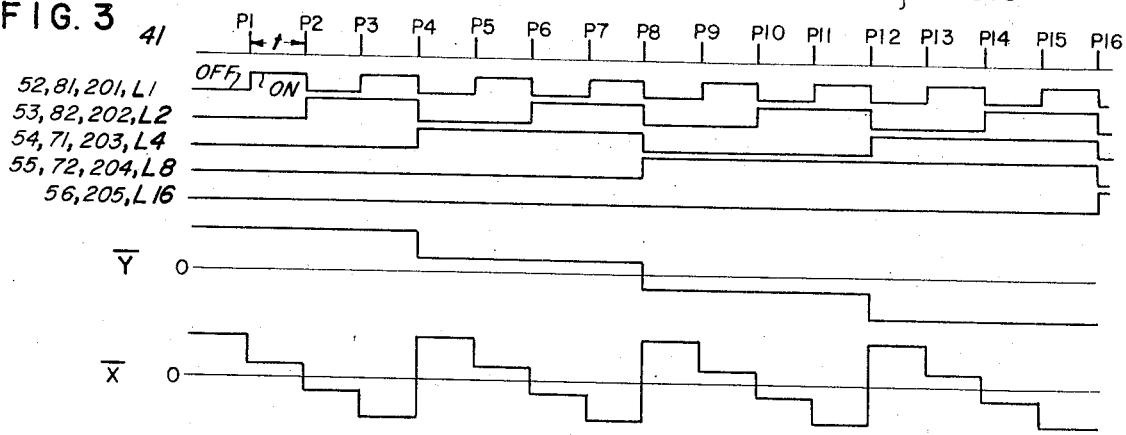

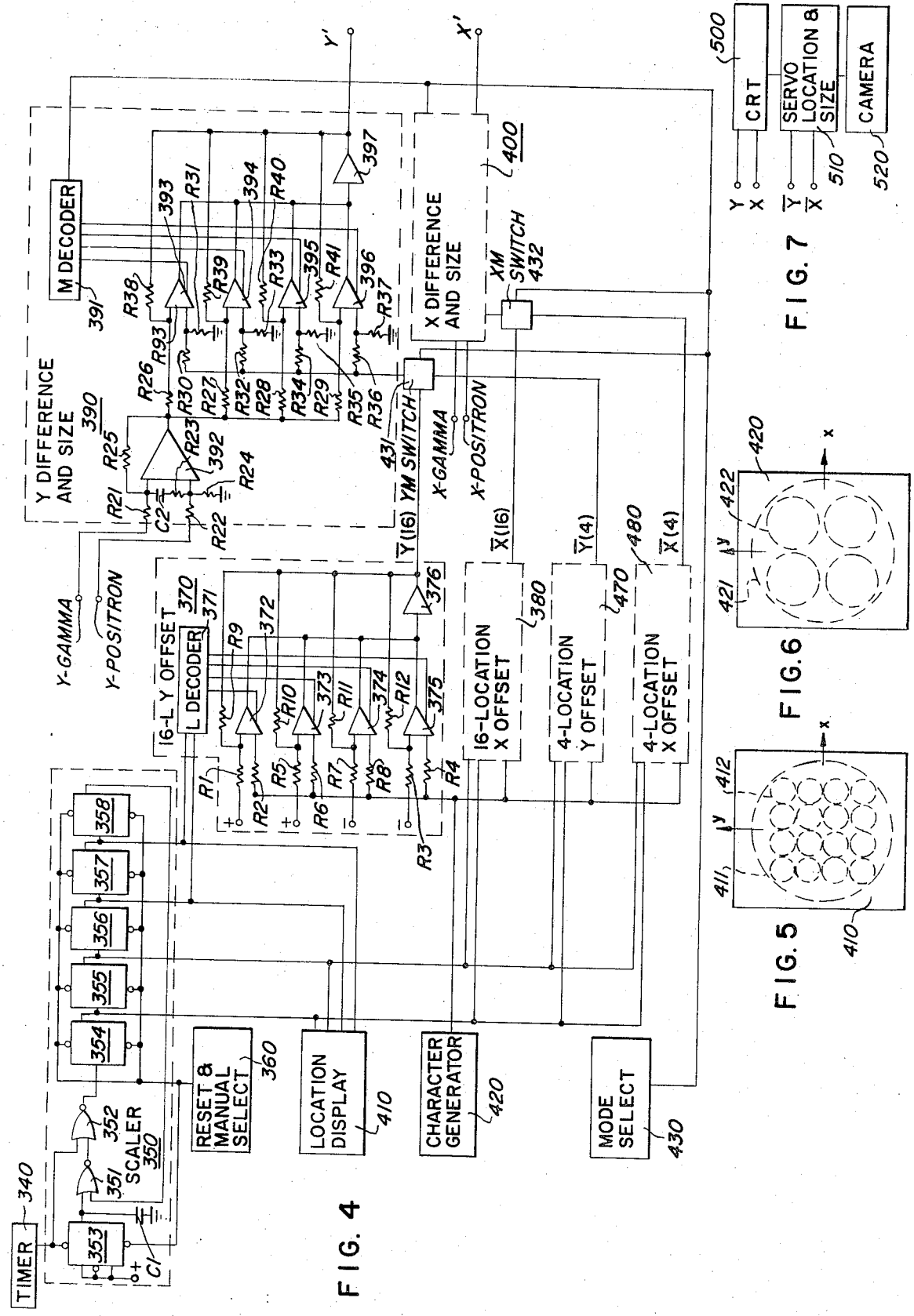

SCINTILLATION CAMERA WITH RAPID SEQUENCE IMAGING DEVICE

Scintillation cameras are in widespread use in a large number of medical institutions throughout the world. The most widely used scintillation camera is one which has become known as the Anger-type camera and which is described in U.S. Pat. No. 3,011,057. Commercial versions of the Anger-type camera are especially well suited to perform imaging studies of dynamic radioisotope distributions such as, for example, the passage of a bolus of radioactive material through the heart or the distribution of such a bolus throughout the brain. Gamma imaging studies like these are increasing in popularity and importance due to the nature of the diagnostic information which is obtained and to the comparative ease and safety of the gamma imaging techniques in contrast to the difficult and risky x-ray imaging procedures using contrast media.

To perform dynamic gamma imaging studies, it is necessary to be able to produce sequentially recorded images, usually on photographic film, of the changing radioactivity distribution as it is being displayed on the screen of the cathode ray tube (CRT). Methods which have previously been used for obtaining such multiple sequential film images have involved considerable disadvantages.

One method is the rapid, manual pulling of polaroid film by an operator who is watching a timing indicator. This method does not require the use of any additional equipment, but is highly inaccurate and unreliable because the elapsed time for each frame is likely to vary considerably, there is a limit to the framing rate which can be achieved, and the film sometimes jams or rips and thus forces a repeat of the study.

Another commonly used approach involves a 35 or 70 mm camera with an automatic timed film advance. Operation of the film advance at a high framing rate which is especially required for dynamic heart studies leads to frequent problems of mechanical unreliability due to the severe strain on the film-pulling mechanisms. In addition, the film processing and handling problems are often troublesome.

A third method involves a motion picture camera viewing an image display on a persistence-type CRT. This method produces fluoroscopic-type images, which are usually satisfactory, but again film processing and handling, as well as storage of patient records, is often troublesome.

Therefore, it is the principal object of this invention to provide improved apparatus for producing multiple sequential images of dynamic radioisotope distributions.

In accordance with this invention, a series of sequential images is produced on a single sheet of photographic film by minifying the CRT image and stepping the minified image to separate image recording locations on the film under the control of electronic circuitry. In accordance with a preferred embodiment of this invention, a minified CRT image is displayed and electronically stepped to a series of 16 separate positions in a four-by-four array on the CRT screen. The stepping is accomplished automatically under the control of a timer. The CRT screen is viewed by camera apparatus which projects the images onto a sheet of 11 × 14 inch x-ray film. The stepping may also be done under manual control to record a series of static images at the various recording locations.

The advantages of the apparatus of this invention are readily apparent. The single sheet of 11 × 14 film contains all of the dynamic study images and can be processed in commercial x-ray film processors which are present in x-ray departments of most hospitals. The single film sheet record is easy to store with other patient records. A very important advantage is the high reliability of the single film approach, and the capability to step the minified image from one location to another with a dead time between image frames which is a fraction of the dead time involved in mechanical film pulling. Another important advantage is the considerable savings in the cost of film.

Other objects, features, and advantages of this invention will be apparent from a consideration of the following detailed description in conjunction with the accompanying drawings which are briefly described as follows:

FIG. 1 is a block schematic diagram of a preferred embodiment of this invention;

FIG. 2 is a partly block and partly circuit schematic diagram of one implementation of a preferred embodiment of this invention;

FIG. 3 is a series of pulse timing and circuit operation charts for the embodiment of FIG. 2;

FIG. 4 is a block schematic diagram of an alternate implementation of a preferred embodiment of this invention;

FIGS. 5 and 6 are pictorial representations of the resultant image recording locations on a single sheet of film;

FIG. 7 is a partial block diagram of an alternate embodiment of this invention.

FIG. 1 shows the typical components of an Anger-type camera, including a collimator 10, detector head 20, detector electronics 30, CRT 110, and photographic camera 120. The functioning of these components is described in U.S. Pat. No. 3,011,057 and in many publications on the Anger-type camera. It is thus well known to persons of ordinary skill in this art and need not be repeated here. A commercial version of the Anger-type camera is available from Nuclear-Chicago Corporations, Des Plaines, Illinois, and is marketed under the trade name "Pho/Gamma HP." For purposes of illustrative description of this invention, the Nuclear-Chicago Corporation version will be employed, and thus the photographic camera 120 which holds 11 × 14 inch x-ray film will be considered to be the optical accessory which is commercially marketed by Nuclear-Chicago Corporation under the trade name "Photoscope." The Photoscope accessory was previously used to enlarge the image on the CRT to a size equal to the useful imaging area of the Pho/Gamma detector (about 10 inches) for life-size imaging.

FIG. 1 also shows, in block form, the preferred embodiment of this invention in association with an Anger-type camera. A timer 40, which may be the timer built into the Pho/Gamma camera system or a separate one, has its output connected to scaler 50. Scaler 50 may also be controlled by outputs from manual circuitry 60. The output of scaler 50 feeds an electron beam biasing means in the form of Y axis offset generator 70 and X axis offset generator 80. Output $\bar{Y}$ of Y axis offset generator 70 and output $\bar{X}$ of X axis offset generator 80 feed Y difference and size circuit 90 and X difference and size circuit 100. X and Y signals from detector electronics 30 are also fed to X and Y difference and size circuits 90 and 100. Signals X and Y are position coordinate signals representing the location of interaction of a radiation quantum (e.g. a gamma ray) with a scintillation crystal (not shown) in detector head 20, as is well known. Signals $\bar{X}$ and $\bar{Y}$ are axis location signals which take on discrete unique values to define axis offset locations. Four discrete values of $\bar{X}$ and four discrete values of $\bar{Y}$ define a four-by-four array of separate locations. Scaler 50 controls the sequential generation of the different $\bar{X}$ and $\bar{Y}$ signals and is, in turn, controlled by either timer 40 or manual control 60. X difference and size circuit 100 functions to attenuate the X signal for control of image size and to combine the attenuated X signal with the $\bar{X}$ signal to produce a X' signal which is fed to electron beam deflection circuitry in the CRT 110. Y difference and size circuit functions similarly to produce a Y' signal for inputing CRT 110. The result is a flash of light on the screen of CRT 110 for each set of X, Y signals with a large number of such flashes resulting in a minified image at a location defined by the values of the $\bar{X}$, $\bar{Y}$ signals. As the $\bar{X}$, $\bar{Y}$ signals step through their various values, the position of the minified image changes. The 11 × 14 inch film in camera 120 records each separate minified image. For example, scaler 50 may be constructed to accumulate sixteen spaced timing pulses from timer 40 and to cause X and Y axis offset generators 80 and 70 to generate sixteen unique combinations of $\bar{X}$ and $\bar{Y}$ signals to produce a four-by-four array of minified images on film in camera 120. The framing time for each image is preselected by setting the interval between pulses from timer 40. With appropriate fast electronic circuitry, the dead time between frames is less than 1 millisecond so that very little image data is lost between frames.

FIG. 2 shows one implementation of a preferred embodiment of this invention and will be described in conjunction with the charts in FIG. 3. Timer 40 produces equally spaced timing pulses on output lead 41 as shown in FIG. 3. The interval t between pulses can be preselected for different framing rates appropriate for different dynamic studies. Assume switch 61 is set to conduct timing pulses to scaler 50. Scaler 50 comprises a NOR-gate 51 and five flip-flops 52 to 56 to accumulate input pulses in the form of binary digits. Assuming all flip-flops have been reset, 16 timing pulses on lead 41 will step scaler 50 through 16 unique binary states represented by combinations of ON and OFF conditions of flip-flops 52 to 56. Each of the first 16 positive going timing pulses will cause the output of NOR-gate 51 to go negative and switch flip-flop 52 to a different stable state. Flip-flop 53 changes state every two input pulses, flip-flop 54 every four input pulses, etc., as shown in FIG. 3.

The state of flip-flop 52 controls the states of transistors 81 and 201 such that when flip-flop 52 is ON, so are transistors 81 and 201, and vice versa. Light L1 is ON when transistor 201 is ON. The state of flip-flop 53 controls the states of transistors 82 and 202 and light L2. The state of flip-flop 54 controls the states of transistors 71 and 203 and light L4. And so on for flip-flops 55 and 56.

X axis offset circuit 80 functions essentially as a two bit digital-to-analog converter, i.e., it converts the four possible combinations of binary digital states of flip-flops 52 and 53 to four separate voltage levels which are the $\bar{X}$ output signals. Similarly, Y axis offset circuitry 70 converts the four possible combinations of binary states of flip-flops 54 and 55 to four separate voltage levels which are the $\bar{Y}$ output signals.

Assume all flip-flops are initially reset to the OFF state. Transistors 81, 82, 71 and 72 are OFF, as are transistors 201 to 205, so lights L1, L2, L4, L8, or L16 are all OFF. Analog voltages $\bar{X}$ and $\bar{Y}$ at the outputs of operational amplifiers 83 and 73 are at their maximum and are fed to one of the differential X and Y CRT inputs. X, Y signals from detector electronics 30 are attenuated by a factor of about 4 and fed to the other differential CRT inputs. The result is a minified image at one extreme corner of the screen of CRT 110.

When the first timing pulse P1 occurs, transistors 81 and 201 are turned ON as flip-flop 52 changes to an ON state. Light L1 goes ON to signal that the first image in the sequence is completed. Transistor 81, being ON, interjects a fixed amount of current at the input of operational amplifier 83 and the result is a step down in output voltage $\bar{X}$ to a new lower level. $\bar{Y}$ remains the same, so the second minified image is produced at a new X location.

The second timing pulse P2 turns OFF flip-flop 52 and transistors 81 and 201, and flip-flop 53 and transistors 82 and 202 turn ON. Light L2 turns ON to indicate that the second image is completed. Transistor 82 interjects a larger amount of current at the input of operational amplifier 83, and the result is a further step down in output voltage $\bar{X}$ and a third minified image positioned at a third X location.

The third timing pulse P3 turns ON flip-flop 52 and flip-flop 53 stays ON. The currents injected by transistors 81 and 82 combine at the input of operational amplifier 83, and the result is a third step down in output voltage $\bar{X}$ and a fourth minified image positioned at a fourth X location. Note the Y location hasn't yet changed. Lights L1 and L2 are ON to signal that the third image has been completed.

The fourth timing pulse P4 turns OFF both flip-flops 52 and 53, and turns ON flip-flop 54. The output signal $\bar{X}$ returns to its original level, and current injected by transistor 71 at the input of operational amplifier 73 lowers the output voltage $\bar{Y}$ by one step. Light L4 goes on to indicate four images have been produced. The lowered $\bar{Y}$ signal causes the fifth minified image to be produced at a new Y location. This new Y location stays the same through timing pulses P5, P6, and P7 while the $\bar{X}$ signal is going through another set of steps, and the sixth, seventh, and eighth images are produced.

Pulse P8 turns OFF flip-flop 54 and turns ON flip-flop 55. Transistor 72 interjects a larger current and lowers the output $\bar{Y}$ voltage. This $\bar{Y}$ signal stays for three more timing pulses, P9-P11, while the $\bar{X}$ signal goes through its cycle of steps for the third time. On pulse P12, flip-flop 54 turns back ON, and the combined currents injected by transistors 71 and 72 drive output signal $\bar{Y}$ to its lowest level, where it remains while the $\bar{X}$ signal goes through its fourth and final cycle of steps.

When pulse P16 occurs, flip-flops 52 to 55 all turn OFF and flip-flop 56 turns ON to disable NOR-gate 51 and prevent further stepping of scaler 50. Further data display is stopped at this point to avoid display of an overriding image at the first location and light L16 indicates the matrix is full.

Thus the circuitry of FIG. 2 functions to provide a four-by-four array of minified images in a time sequenced fashion which are recorded on 11 × 14 x-ray film. FIG. 5 shows such a four-by-four array with the circle designated 412 as the boundary of an exemplary image location. It should be apparent that smaller or larger arrays of minified images could be produced by obvious alterations of the circuitry shown.

With switch 61 in the lower position, scaler 50 can be pulsed manually by switch 62. This provides the capability of recording static gamma images at the various locations such that up to 16 static image frames could be recorded on the 11 × 14 inch film. It should also be apparent that the circuitry of FIG. 2 could be programmed to step automatically through twelve to fourteen frames for dynamic imaging with the remaining two to four frames reserved for manual stepping to record static images following the dynamic images.

The following are component values and types for the circuitry of FIG. 2:

| Resistors: 206, 207, 208, 209, 210, | |
|---|---|
| 77, 79, 87, 89 | 470 ohm |
| 211, 212, 75, 85 | 15K ohm |
| 86, 76 | 5K ohm |
| 78, 88 | 10K ohm |
| 74, 84 | 1K ohm |
| Transistors: 201–205 | 2N2218 |
| 71, 72, 81, 82 | 2N706 |
| Flip-Flops: 52–56 | MC790P |
| Operational Amplifiers: 73, 83 | MC1439G |
| Lamps: L1, L2, L4, L8, L16 | CM22-1-XX-50 |

FIG. 4 shows an alternate implementation of a preferred embodiment involving a more complex approach. Timer 340 and scaler 350 function in essentially the same way as the similar circuits in FIG. 2. The four outputs of flip-flops 354 to 357 feed location display 410 which comprises a binary decoder operating a matrix of lamps numbered 1 to 16. Reset and manual select circuit 360 functions to reset all flip-flops to the OFF condition and to select a particular stored number in scaler 350. In particular, a four-by-four pushbuton array (not shown) can be arranged to have decoded outputs to operate set and reset terminals of flip-flops 354–358 in a manner well known to persons skilled in design of logic circuitry.

The two outputs from flip-flops 354 and 355 feed 16-location X offset generator 380 and both 4-location X and Y offset generators 470 and 480. The two outputs from flip-flops 356 and 357 feed 16-location Y offset generator 370, the circuitry of which is shown in detail. The circuitry in block 380 is essentially identical to that in block 370. The circuitry in blocks 470 and 480 is identical in form to that in block 370 but the component resistor values are different for the reason that the offset voltages required to produce a two-by-two array of image locations are different from those needed to produce a four-by-four array.

Sixteen-location offset generator 370 functions generally as a two-bit digital-to-analog converter. L decoder 371 decodes the bit values in flip-flops 356 and 357 to turn on appropriate ones of operational amplifiers 372 to 375 whose outputs are summed at the input to amplifier 376. The magnitude of output voltage $\bar{Y}(16)$ depends upon which of the amplifiers are turned on and these voltages follow the same sequence as the $\bar{Y}$ voltages shown in FIG. 3. In addition, character generator 420 feeds signals to the differential inputs of operational amplifiers 372–375 to superimpose on the essentially DC voltage a varying signal which will move the CRT beam to write characters which are recorded at a particular film location. This enables the writing of patient identification and study parameter date on the film while the study is being performed.

Y difference and size circuit 390 receives Y-gamma and Y-position signals from detector electronics 30 in FIG. 1. The Y gamma signals are typically the operative ones, except that, as is well known, in a "positron coincidence" mode of imaging, both signals arrive in coincidence, and operational amplifier 392 functions in a difference amplifier mode. The Y-gamma signal is coupled through operational amplifier 392 to parallel inputs of operational amplifiers 393–396. Y difference and size circuit 390 also receives $\bar{Y}(16)$ signals from 16-location offset generator 370 coupled through YM switch 431 to parallel differential inputs of operational amplifiers 393–396. M decoder 391 decodes signals from mode select circuit 430 to turn on selected ones of the operational amplifiers 393–396. Basically, operational amplifiers 393–396 function to combine the Y-gamma signal and the $\bar{Y}(16)$ signal to produce a Y' output signal. The signal transfer gain is determined by which operational amplifiers are turned ON by M decoder 391, and this determines the size of the minified images on CRT 110 (FIG. 1). The location of the minified image is determined by the value of $\bar{Y}16$. In the 16-location mode, the transfer gain is set such that the image size associated with the Y-gamma signal is reduced by a factor of about four to produce an appropriate image size associated with the Y' signal.

X difference and size circuit 400 is identical in form and function to Y difference and size circuit 390. XM switch 432 and YM switch 431 function under the control of mode select circuit 430 to alternatively couple the $\bar{Y}(16)$ and $\bar{X}(16)$ or the $\bar{Y}(4)$ and $\bar{X}(4)$ signals through to X and Y difference and size circuits 390 and 400. Thus when the 16-location mode is selected, $\bar{Y}(16)$ and $\bar{X}(16)$ signals are coupled into X and Y difference and size circuits 390 and 400; and the gain is selected through M decoder 391 and its equivalent in block 400 to produce in sequential fashion 16 minified images on CRT 110 (FIG. 1). FIG. 5 shows an example of the 16-location image on film 410 in "Photoscope" camera 120 (FIG. 1).

The 4-location mode is typically used to record four separate static radioisotope studies and involves manually stepping through the four locations. In the 4-location mode the $\bar{Y}(4)$ and $\bar{X}(4)$ signals are coupled through YM switch 431 and X(M) switch 432. The gain of circuits 390 and 400 is selected by the mode decoders (391 and its equivalent in block 400) to be appropriate for the four minified images to be produced. Manual select circuit 360 steps scaler 350 through 4 counts under operator control. The result is as depicted in FIG. 6 with four images on film 420.

In FIG. 5, 411 designates the boundary of a full size image of the CRT screen on the 11 × 14 inch film 410. 412 designates the boundary of one of the minified images in the 16-location mode. In FIG. 6, 421 designates the full size image, and 422 designates the boundary of one of the minified images in the 4-location mode. The size of the minified images on film could be increased by altering the lens setting of the "Photoscope" to use more of the film.

The component types and values for the circuitry in FIG. 4 are the following:

| Resistors: | R1, R2, R3, R4 | 27K ohm |
| --- | --- | --- |
| | R5, R6, R7, R8 | 9.1K ohm |
| | R9, R10, R11, R12 | 2.7K ohm |
| | R21, R22, R26–R37 | 10K ohm |
| | R23 | 10 ohm |
| | R24, R25 | 5K ohm |
| | R38 | 7.5K ohm |
| | R39 | 3.74K ohm |
| | R40 | 15K ohm |
| | R41 | (variable) 25K ohm |
| Capacitor: | C1 | 100 mfd |
| | C2 | .01 mfd |
| Flip-flops | | SN 7476 |
| NOR-gates | | SN 7402 |

Amplifiers and decoders in blocks 370 and 390 are all on Harris semiconductor chip HA 2405-5. Amplifier 392 is type 72702.

In blocks 470 and 480 all resistors R1 through R8 are 13K ohm and resistors R9 through R12 are 2K ohm.

FIG. 7 shows an alternate embodiment of the principles and concepts of this invention. Instead of minifying the images on the CRT and providing electronic stepping of such images to separate locations, CRT 500 displays a full size image. A servo location and size mechanism 510 functions under the control of the $\bar{X}$ and $\bar{Y}$ signals generated by the axis offset generators to minify the image optically and mechanically step the minified image on film in camera 520. For example, a mirror driven by X and Y servo stepping motors could be employed to step the image rapidly from one location to another. A single lens or lens system could be employed in the optical pathway from CRT 500 to film in camera 520 to minify the image and its placement could be manually or electrically alterable for 16-location and 4-location modes of imaging.

The above descriptions are given solely for purposes of illustrating examples of embodiments of this invention, and numerous different approaches and changes could be made without departing from the scope of this invention as claimed in the following claims.

We claim:

1. A radiation imaging and visual display device for displaying plural images of a radioactive object, each image representing radioactive distribution in said object during a different time interval within a measurement period, comprising:

a. radiation imaging means including a radiation sensitive transducer operative to produce pairs of electrical signals respectively representing X and Y directional components of interactions of quanta of radiation therewith in a two dimensional co-ordinate system, b. a cathode ray tube connected to said radiation imaging means and equipped with a screen and generating an electron beam impinging upon said screen and including beam deflection circuitry acting upon said electron beam in mutually perpendicular directions to which the aforesaid X and Y directions correspond to receive said pairs of electrical output signals and to display a flash of light of temporary duration on said screen in response to each of said pairs of electrical output signals, c. electron beam biasing means acting upon the aforesaid beam deflection circuitry to advance the electron beam in stepwise fashion across the screen in the aforesaid mutually perpendicular directions to a plurality of separate and mutually exclusive image recording areas on said screen, d. timing means controlling said electron beam biasing means to cause the aforesaid beam to produce flashes of light only within a single one of said image recording areas for a predetermined time interval and to thereafter actuate said electron beam biasing means to advance said beam to a next sequential image recording area during a measurement period, and e. photographic film positioned in visual communication with said screen of said cathode ray tube for permanently recording separate images each representing those flashes of light produced on said screen within a particular time interval.

2. A radiation imaging and visual display device in combination comprising:

radiation imaging means including a radiation sensitive transducer operative to produce pairs of electrical output signals representing two dimensional spatial co-ordinates of interactions of quanta of radiation therewith, and image recording means comprising:

a. a cathode ray tube having a screen and operative to generate a single flash of light of temporary duration at a single one of a discrete number of possible positions on said screen associated with the spatial coordinates of interaction of a quantum of radiation with said transducer in response to each of said pairs of electrical output signals, b. signal generating means for producing, in the same aforesaid discrete number, combinations of predetermined electrical offset signals as inputs to said cathode ray tube to define, in the same aforesaid discrete number, image recording locations on said screen, each location corresponding to a single unique combination of said offset signals, c. visual indicating means connected to said offset signal generating means for identifying the unique combination of offset signals being passed from said signal generating means to said cathode ray tube at any instant, d. offset signal governing means controlling said signal generating means to sequentially produce no more than a single one of said unique combinations of offset signals at any instant, and to shift to the next sequential combination of offset signals after a predetermined elapsed time interval, and e. photographic film positioned in visual communication with said screen of said cathode ray tube for permanently recording the flashes of light produced on said screen.

3. In combination:

a radiation imaging device, including a radiation sensitive transducer, operative to produce a pair of electrical output signals representing spatial coordinates of interaction of a quantum of radiation with said transducer;

image recording means receiving said output signals and operative to define a plurality of discrete image recording locations comprising:

a pair of offset generators producing a pair of recording location signals having n and m discrete values, respectively, where n and m are integers greater than one;

combining means for combining said pair of coordinate electrical output signals and said pair of recording location signals to produce a pair of modified coordinate electrical signals associated with one of said discrete image recording locations;

a cathode ray tube for displaying said pair of modified coordinate electrical signals as a spatially located flash of light; and camera means for recording said flash of light on a photographic medium;

and control means coupled to said image display and recording means and operative to select one of said discrete image recording locations for said output signals in accordance with one of a manual selection mode and an automatically timed stepping mode comprising:

a scaler having a counting capability equal to the product of $n$ and $m$, and having outputs coupled to said pair of offset generators for controlling the generation of said recording location signals;

a timer for producing timing pulses at regular preselected intervals for accumulating in said scaler;

a manual pulser for producing pulses for accumulating in said scaler; and a mode switch for selecting one of said timer and said manual pulser for inputting said scaler.

4. The apparatus of claim 3 further comprising attenuation means acting upon said electrical output signals, whereby minification of images of objects emitting radiation is effected in said cathode ray tube.

* * * * *